July 5, 1960
B. W. SCHABOT
2,943,394
TAPERED HOLE GAGE
Filed Aug. 23, 1956
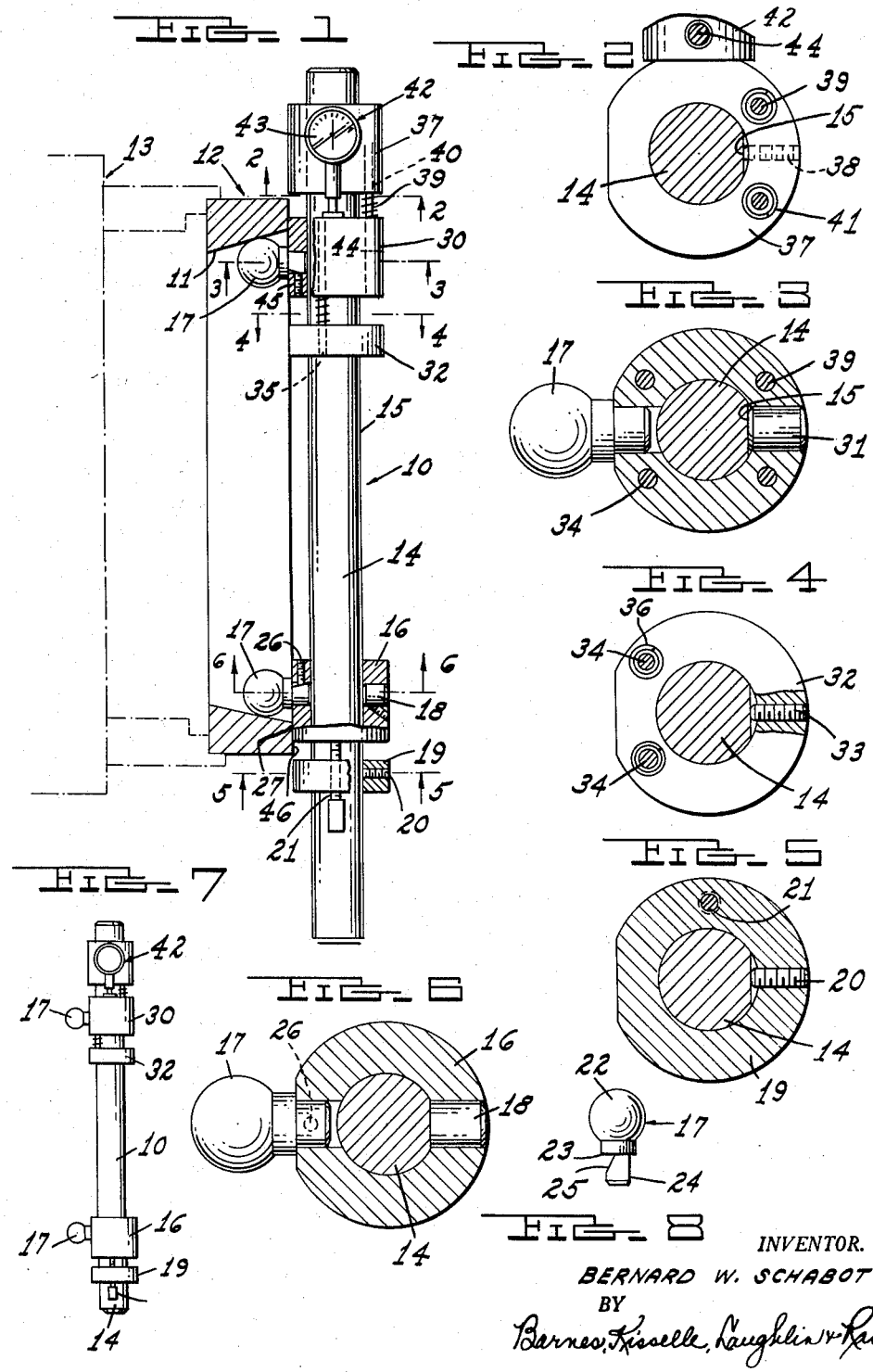
INVENTOR.
BERNARD W. SCHABOT
BY
Barnes, Kisselle, Laughlin & Raisch
ATTORNEYS

United States Patent Office 2,943,394
Patented July 5, 1960

2,943,394
TAPERED HOLE GAGE

Bernard William Schabot, Royal Oak, Mich., (% A. A. Gage Company, 350 Fair St., Ferndale Station, Detroit 20, Mich.)

Filed Aug. 23, 1956, Ser. No. 605,799

1 Claim. (Cl. 33—147)

This invention relates to gages which are used for measuring tapered holes in workpieces and particularly to a gage for checking the diameter and taper of tapered holes.

At the present time when it is desired to check a tapered hole in a workpiece either for diameter or taper, it is necessary to remove the workpiece from the machine on which it is being worked and place it on a gaging surface where the diameter and taper are measured by the use of accurate gage blocks and balls of predetermined diameter.

Such a method of checking has certain definite disadvantages. First, the removal of the part from the machine necessitates the expenditure of a great deal of time, resulting in an increased cost of the part. Second, the checking by placing on a gaging surface and using accurate gaging blocks and balls requires an accurate and experienced sense of touch and, even then, the measurement may vary between experienced workmen. Third, the part must be removed from the machine and subsequently replaced each time a measurement is to be taken.

It is therefore an object of this invention to provide a gage for checking the diameter and taper of a tapered hole in a part without removing the part from the machine on which it is being worked.

It is a further object of this invention to provide such a gage wherein similar results may be consistently obtained by various workmen.

It is a further object of this invention to provide such a gage which can be used to check accurately without requiring an experienced sense of touch.

In the drawings:

Fig. 1 is a part sectional elevational view of the tapered hole gage in position for checking the diameter of a tapered hole in a part.

Fig. 2 is a sectional view taken along the line 2—2 in Fig. 1.

Fig. 3 is a sectional view taken along the line 3—3 in Fig. 1.

Fig. 4 is a sectional view taken along the line 4—4 in Fig. 1.

Fig. 5 is a sectional view taken along the line 5—5 in Fig. 1.

Fig. 6 is a sectional view taken along the line 6—6 in Fig. 1.

Fig. 7 is an elevational view of the gage on a reduced scale.

Fig. 8 is an elevational view of a gaging ball removed from the gage.

Referring to Fig. 1, gaging device 10 is shown in position for checking the diameter of a tapered hole 11 in workpiece 12 mounted in a machine 13. Gage 10 comprises a shaft 14 which is circular in cross section except for a flat surface 15 extending longitudinally thereof. A support 16 is mounted adjacent one end of shaft 14 and supports an accurately machined ball member 17. Support 16 is provided with a plug 18 extending inwardly into contact with flat surface 15 of rod 14 (Figs. 1 and 6) so that support 16 is prevented from rotating relative to shaft 14. Support 16 is slidable longitudinally on shaft 14 and the position thereof is adjustably maintained by a collar 19 held in fixed position on shaft 14 by set screw 20. A screw 21 is threaded through collar 19 and into support 16 so that by rotation of screw 21 the position of support 16 axially of shaft 14 may be changed.

Ball member 17 comprises an accurately machined spherical surface 22, a collar 23 and a stem 24 extending radially. Stem 24 is provided with an inclined surface 25 which extends inwardly toward spherical surface 22. Ball member 17 is mounted in support 16 by pushing stem 24 into an opening in support 16. A set screw 26 is threaded through one side of support 16 and acts on inclined surface 25 of ball member 17 to maintain the ball member 17 in position on support 16. Support 16 is provided with an accurately machined flat surface 27 against which the base of collar 23 rests.

Another ball member 17 of identical size and shape is mounted on a second support 30. Support 30 is also provided with a plug 31 which extends inwardly and has a flat portion riding against flat surface 15 on shaft 14 to prevent rotation between support 30 and shaft 14. Support 30 is mounted for limited movement axially in either direction on shaft 14. A collar 32 is mounted on shaft 14 and maintained in position by a set screw 33. Guide rods 34 are mounted on support 30 and extend through openings 35 in collar 32. Compression springs 36 surround the guide rods 34 and yieldingly urge support 30 away from collar 32 and axially toward the upper end of shaft 14. A third collar 37 of greater width than collars 32 or 19 is mounted near the upper end of shaft 14 and held in adjustable position by a set screw 38. A second set of guide rods 39 is mounted in support 30 and extends upwardly into openings 40 in collar 37 and compression springs 41 surround guide rods 39 and yieldingly urge the support 30 away from collar 37 and axially toward collar 32. In this manner, support 30 is yieldingly held in position between collar 37 and collar 32. A micrometer gage 42 of usual construction has its housing 43 mounted on collar 37 with plunger 44 extending into contact with the support 30 in such a manner that movement of support 30 will move plunger 44 and cause a change in the dial reading of micrometer 42.

Support 30 is also provided with an accurately machined flat surface 45 which lies in the same plane as machined surface 27 of support 16. The plane of surfaces 45 and 27 is parallel to the axis of shaft 14 and to a line extending between the centers of spherical surfaces 22 of ball members 17.

When it is desired to check the diameter of a tapered hole, the gage is handled by means of shaft 14 and is brought into position adjacent workpiece 12 with surface 27 of support 16 in contact with the peripheral surface 46 surrounding the tapered hole and with the spherical surface 22 of ball member 17 on support 16 in contact with the wall which defines tapered hole 11. Surface 45 of support 30 is similarly brought into contact with peripheral surface 46 of the workpiece, and the spherical surface 22 of the second ball member 17 on support 30 is brought into contact with the wall defining the tapered hole. Provided that the gage has been set previously to the desired diameter or within the range of diameters that are to be measured, the micrometer gage 42 will show any deviation from the initial setting. Tapered hole gage 10 may be rotated relative to the workpiece in order that the diameter of the tapered hole at various angular positions may be checked.

In establishing specifications for articles which are formed with a tapered hole, it is customary to specify the size of the hole in terms of the distance between the centers of predetermined sizes of balls which are placed within the hole in contact with the sides of the hole so that my gage can be used to check specifications as they are now established. Checking of the size of the tapered hole at different depths is achieved by changing the size or diameter of the balls. In the applicant's device, the size of the hole at various depths may be checked by changing the size of the ball members 17. By removing one pair of ball members 17 and replacing them with ball members of another size, the size of the tapered hole is checked at a different depth.

By utilizing ball members of different sizes, it is also possible to measure the taper in addition to the size. The difference between the readings utilizing one pair of ball members and the readings utilizing another pair of ball members of different size is a measure of the taper of the tapered hole inasmuch as by utilizing another pair of ball members of different size, the size of the hole is measured at a different depth. In this manner it is possible to obtain accurate readings of the degree of taper of the tapered hole in addition to readings which show the size of the tapered hole.

In using my tapered hole gage, the part or workpiece need not be removed from the machine upon which it is being formed, thus resulting in a great saving of time and in turn of cost in making the part. The use of the applicant's tapered hole gage permits the average workman to make accurate readings and moreover these readings will check accurately against those made by another workman. This results in a greater uniformity of the parts being made.

I claim:

In a tapered hole gage, the combination comprising a shaft, said shaft having a circular cross section except for a flat area extending longitudinally of said shaft, a first collar on said shaft, a second collar on said shaft, each said collar having a circular opening therein having a diameter substantially equal to the diameter of said shaft, a plug extending radially inwardly from each said collar into contact with a portion of said flat area of said shaft thereby nonrotatably mounting said collars on said shaft, means for fixing said first collar on said shaft, means for mounting said second collar on said shaft for yielding movement longitudinally of said shaft toward and away from said first collar, a ball member mounted on each said collar with the ball portion thereof extending radially outwardly, each said collar having a flat surface adjacent its respective ball, said flat surfaces lying in a plane parallel to a line connecting the centers of said balls and disposed between the axis of said shaft and the line connecting the centers of said balls, a third collar nonrotatably mounted and fixed on said shaft adjacent said second collar with said second collar between said first and third collars, and a micrometer having a dial and a plunger movable to cause a reading on said dial, and means for mounting said micrometer on said third collar with said plunger in contact with said second collar whereby any longitudinal movement of said second collar on said shaft relative to said first collar causes a change in the dial reading, each said collar including an opening therein adjacent its respective flat surface, each said ball member including a stem extending into the opening in its respective collar, and means for removably fixing said ball member on said collar, said means for removably mounting each ball member on its respective collar comprises an inclined surface on said stem, said surface extending generally radially inwardly toward the center of the ball portion of said ball member, and a screw threaded on said collar into contact with said inclined surface and preventing the removal of said collar, whereby said ball members can be readily changed to measure the size of a tapered hole at different depths.

References Cited in the file of this patent

UNITED STATES PATENTS

| | | |
|---|---|---|
| 2,178,293 | Wogeck | Oct. 31, 1939 |
| 2,431,826 | Pozar | Dec. 2, 1947 |
| 2,825,975 | Cameron | Mar. 11, 1958 |

FOREIGN PATENTS

| | | |
|---|---|---|
| 220,774 | Switzerland | July 16, 1942 |
| 584,462 | England | Jan. 15, 1947 |
| 250,403 | Switzerland | June 16, 1948 |

OTHER REFERENCES

American Machinist, p. 384, Feb. 27, 1930.
Tooling & Production, p. 77, June 1956.
Tooling & Production, pages 76 and 78, June 1956.